Patented Nov. 25, 1952

2,619,476

UNITED STATES PATENT OFFICE

2,619,476
MELAMINE COATING RESINS

Theodore P. Malinowski, Springfield, Mass., assignor to Monsanto Chemical Company, St. Louis, Mo., a corporation of Delaware No Drawing. Application March 25, 1950,
Serial No. 151,987

5 Claims. (Cl. 260—21)

This invention relates to methylol melamine ethers. More particularly, the invention relates to mixed ethers of methylol melamine having improved properties for surface coating purposes.

The methylol melamine ethers of alcohols having up to eight carbon atoms have been developed in recent years as surface coating resins either to be used alone or in conjunction with polyester resins, drying oils or mixtures thereof. These resins have attained much success in the surface coating field but have been restricted in their use by a limited compatibility with drying oils and relatively slow cure rate at low temperatures, i. e., from 20° C. to 80° C.

One object of this invention is to provide new mixed ethers of methylol melamines.

A further object is to provide methylol melamine ethers having increased compatibility with drying oils.

Another object is to provide methylol melamine ethers which cure at relatively low temperatures and especially at normal atmospheric temperatures.

Still another object is to provide surface coating compositions having improved gloss and improved drying speed.

These and other objects are attained by reacting an ether of a methylol melamine with hydroxy dihydro dicyclopentadiene under acid conditions and employing the resulting mixed ether in surface coating compositions.

Hydroxy dihydro dicyclopentadiene which has also been described as dihydro dicyclopentadienyl alcohol or dihydro dicyclopentenyl alcohol has the following formula:

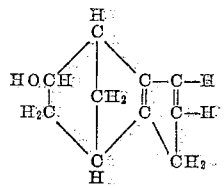

It may be prepared by reacting dicyclopentadiene with aqueous sulfuric acid as set forth in U. S. Patent 2,385,788 and probably exists in the "exo" form pictured above, as described in an article by Bartlett & Schneider, J. A. C. S. 68, 6, 946.

The following examples are given in illustration and are not intended as limitations on the scope of this invention. Where parts are mentioned, they are parts by weight.

Example I

A reaction mixture was prepared by stirring together about 360 parts (1 mol) of a pentamethyl ether of methylol melamine of low molecular weight with about 450 parts (3 mols) of dihydro dicyclopentadienyl alcohol until a clear solution was obtained. About 6 parts of methyl phosphoric acid were added to the solution which was then heated for about 2 hours with constant agitation at 90–100° C. and at a pressure of 1–12 mm. mercury absolute. Part of the reaction mixture was removed and allowed to cool. It was a soft, non-tacky, moldable resin which could be cured into a hard, dry product by heating for about 10 minutes at from 50° C. to 100° C. This soft resin would cure at room temperature, i. e., from 20° C. to 40° C., but the curing time was relatively long, running as high as 3 days for a complete cure.

The rest of the reaction mixture was heated further at about 100° C. for about one-half hour at a pressure of from 5 to 10 mm. mercury absolute. The reaction mixture was then cooled to result in an extremely hard, brittle resin.

Both of the resins thus produced were soluble in organic solvents. The soft resin was dissolved in a mixture of xylol and butanol to obtain a 60% solids solution. This solution was then modified with bodied linseed oil and alkyd resins of both short and long oil length. The soft resin was compatible with each of these modifiers and films prepared therefrom could be air dried or cured at temperatures from 15° C. to 200° C. The hard resin was found to be compatible with bodied linseed oil and the long oil alkyds, but only partially compatible with short oil alkyds. Films prepared from each of the compatible combinations mentioned above were compared with films prepared from similar compositions in which the resins of this invention were replaced by a butyl ether of methylol melamine. The modified butyl ether films were not as glossy and were slightly harder and more brittle than the films containing the resins of Example I.

Example II

Pentamethyl ether of methylol melamine, similar to that used in Example I, was reacted with dihydro dicyclopentadienyl alcohol in a mol ratio of one of melamine ether to two of alcohol in the presence of a small amount of methyl phosphoric acid catalyst. The reaction was carried out at a pressure of from 30 to 55 mm. mercury absolute and at a temperature of from 90° C. to 100° C. for about one-half hour. A portion of the reaction product was removed and allowed to cool. It was a sticky, viscous resin which would not air cure at normal temperatures over a period of about one month. The remainder of the reaction mixture was further heated at the same reduced pressure at about 90° C. for another one-half hour. This product, on cooling, was a hard resin soluble in ethyl acetate. Films cast from an ethyl acetate solution were hard, brittle and clear. The hard resin was compatible with tung oil in equal proportions by weight whereas the methyl ether starting material was incompatible with tung oil. A film prepared from a mixture of equal parts of the hard resin and tung oil air-dried at normal temperature in about 3 days. The dried film was hard, tough and glossy.

*Example III*

A resin was prepared by a process similar to that of Example I except that the final reaction temperature was raised to 150° C. The resin obtained was hard and brittle. 100 parts of a 50% solution of the resin in benzene were mixed with 100 parts of bodied linseed oil. A film cast from the solution and baked at 100° C. was clear, hard and tough. At room temperature, the resin appeared to be incompatible with the oil, therefore, the solution containing resin and oil were heated under reflux for about 4 hours and then the temperature was raised to about 200° C. and the solvent was removed. The product was a hard resinous mass soluble in various organic solvents. A 50% solids xylol solution of the resin thus prepared was used to cast films. The films dried slowly at normal temperatures to a tack-free state but cured quickly if modified with a small amount of metallic driers.

*Example IV*

A resin was prepared by reacting one mol of a low molecular weight pentabutyl ether of methylol melamine with three mols of the dihydro dicyclopentadienyl alcohol in the presence of a catalytic amount of ethyl phosphoric acid at reduced pressure and at a temperature of about 100° C. A hard, brittle resin was obtained which was compatible with drying oils and alkyd resins of both short and long oil length. Films prepared from mixtures of the resin with oils and alkyd resins could be cured at elevated temperatures, i. e., from 50° C. to 100° C., and at temperatures below 50° C. if a small amount of metallic drier were added. The cured films were hard and had a high gloss.

The mixed ethers of this invention contain from one to three dihydro dicyclopentadienyl alcohol residues per mol of methylol melamine and from five to two alkyl residues derived from aliphatic alcohols containing from one to eight carbon atoms. The lower aliphatic alcohols include methanol, propanol, isopropanol, butanol, isobutanol, pentanols, hexanols and octanols. The amount of the dihydro dicyclopentadienyl alcohol reacted with the methylol melamine ether partially determines the drying time and the oil compatibility of the mixed ether. If only one mol of the alcohol is reacted, the drying time of the resulting film is fairly long at atmospheric temperatures although it can be shortened to a few minutes at temperatures between 50° C. and 100° C. If the amount of the alcohol be increased to three mols per mol of methylol melamine, the mixed ether will dry quickly at atmospheric temperatures and within a few minutes at higher temperatures. The unmodified lower aliphatic alcohol ethers of methylol melamine dry comparatively slowly even at 100° C., e. g., in about one hour.

In preparing the mixed ethers of this invention, it is essential that an ether interchange reaction be used and that the lower alcohol ether of methylol melamine be of comparatively low molecular weight, no significant degree of condensation having occurred. These low molecular weight ethers may be easily prepared by conducting the condensation and etherification reactions at temperatures below 50° C. and preferably at from 25° C. to 35° C. It was found impossible to prepare the products of this invention by reacting melamine with formaldehyde, the lower aliphatic alcohol and the dihydro dicyclopentadienyl alcohol all at the same time and it further was found impossible to first prepare the methylol melamine and then react it simultaneously with both alcohols. It was further found that the ether interchange reaction could not be accomplished without the addition of a small amount of an acid catalyst although such a reaction has been observed to proceed with other alcohols. The amount of catalyst needed is small, ranging from about 0.5 to about 5.0 parts per 100 parts of methylol melamine ether. The acid catalysts may be any organic or inorganic acid including phosphoric acid, sulfuric, toluene sulfonic, benzene sulfonic, formic, acetic, chloroacetic, etc. acids, or the acid esters thereof.

The ether interchange reaction is preferably carried out at reduced pressure at temperatures from 80° C. to 250° C. At the higher temperatures, the reaction goes to completion more rapidly but the resins tend to develop a yellow brown color, and premature condensation may occur. At from 90° C. to 100° C., the reaction is fast enough to be practical, especially if the pressure is reduced to below 10 mm. of mercury absolute, and the products so obtained are almost colorless.

The mixed ethers of this invention range from slightly tacky vicous liquids to extremely hard and brittle resins. They are readily soluble in common organic solvents. They may be cured to insoluble, infusible products by heating them at temperatures of from 50° C. to 100° C. and the harder resins will cure at temperatures below 50° C. The resins are compatible with drying oils, semi-drying oils, and alkyd resins of varying oil lengths. When used with the drying oils, it is advantageous to heat the drying oil-resin composition with or without solvent for from 10 to 30 minutes under reflux conditions. This heating process causes a preliminary reaction which increases the compatibility of the resin in the oil and decreases the drying time at temperatures below 50° C. Thus, a 50–50 mixture of bodied linseed oil and the mixed ether obtained from pentamethyl methylol melamine is partly incompatible but after a short refluxing treatment the mixture is completely compatible at from 30° C. to 50° C. and films cast therefrom air-dry to a hard glossy coating. The drying rate of the drying oil-resin compositions may also be increased by the incorporation therein of small amounts of the conventional metallic driers such as cobalt and nickel naphthenates and resinates.

The oil-modified alkyl resins which may be used in the coating compositions of this invention are polyesters derived by condensing polyhydric alcohol with polycarboxylic acid and then reacting the condensation product with drying oils or drying oil acids. The amount of drying oil or oil acid may be varied between 10–100 parts per 100 parts of polyester resin. Various drying oils or oil acids may be used such as linseed oil, tung oiticica, perilla, dehydrated castor, etc. oils and acids. The amount of mixed ether resin used may be varied between 5–100 parts per 100 parts of oil-modified alkyd resin. However, optimum results are obtained when between 40–60 parts of the mixed ether are used. Within this range, the beneficial properties of the oil-modified alkyd resins are predominant but the hardness, gloss and drying properties thereof are much improved.

The mixed ether resins may be used with drying oils and semi-drying oils in quantities ranging from 10–100 parts per 100 parts of oil. Among the drying oils, linseed, tung, oiticica, dehydrated castor, and perilla oils are the most common. However, other drying and semi-drying oils may be used alone or in admixture with each other or the more avaliable drying oils cited above. Among these oils are poppyseed, sunflower seed, cashew nut shell, cottonseed, soya bean, sesame, rapeseed, etc. oils.

Various conventional additives may be incorporated in the coating compositions of this invention such as dyes, pigments, fillers, natural and synthetic resins, etc.

The mixed ethers provide surface coating resins which are more compatible with drying oils and alkyd resins to give compositions which have more rapid drying properties than those containing the unmodified lower alkyl ethers of melamine. The films prepared therefrom are hard, glossy and tough thus providing enduring and attractive coatings.

It is obvious that many variations may be made in the products and processes of this invention without departing from the spirit and scope thereof as defined in the appended claims.

What is claimed is:

1. A mixed ether of a methylol melamine which contains from 1 to 3 dihydro dicyclopentadienyl radicals and from 5 to 2 alkyl radicals derived from a saturated aliphatic monohydric unsubstituted alcohol containing from 1 to 8 carbon atoms.

2. A process for preparing a mixed ether of methylol melamine which comprises reacting from 1 to 3 mols of dihydro dicyclopentadienyl alcohol with 1 mol of a low molecular weight ether of methylol melamine in which the ether group is derived from a saturated aliphatic monohydric unsubstituted alcohol containing from 1 to 8 carbon atoms in the presence of a catalytic amount of an acid catalyst.

3. A coating composition comprising a glyceride drying oil and a mixed ether of methylol melamine in which the ether groups comprise from 1 to 3 dihydro dicyclopentadienyl radicals and from 5 to 2 alkyl radicals derived from a saturated aliphatic monohydric unsubstituted alcohol containing from 1 to 8 carbon atoms.

4. A coating composition as in claim 3 which contains a small amount of a metallic drier.

5. A coating composition comprising a glyceride oil acid modified alkyd resin and a mixed ether of methylol melamine in which the ether groups comprise from 1 to 3 dihydro dicyclopentadienyl radicals and from 5 to 2 alkyl radicals derived from a saturated aliphatic monohydric unsubstituted alcohol containing from 1 to 8 carbon atoms.

THEODORE P. MALINOWSKI.

REFERENCES CITED

The following references are of record in the file of this patent:

UNITED STATES PATENTS

| Number | Name | Date |
| --- | --- | --- |
| 2,385,788 | Bruson | Oct. 2, 1945 |
| 2,454,078 | McGrew | Nov. 16, 1948 |